US009836755B2

(12) United States Patent
Zamer et al.

(10) Patent No.: US 9,836,755 B2
(45) Date of Patent: Dec. 5, 2017

(54) DETERMINING A USER'S EVENT EXPERIENCE THROUGH USER ACTIONS

(71) Applicant: STUBHUB, INC., San Francisco, CA (US)

(72) Inventors: Kamal Ahmad Zamer, San Jose, CA (US); Praveen Nuthalpati, San Jose, CA (US); Andrei Margea, San Jose, CA (US)

(73) Assignee: EBAY INC., San Jose, CA (US)

( * ) Notice: Subject to any disclaimer, the term of this patent is extended or adjusted under 35 U.S.C. 154(b) by 337 days.

(21) Appl. No.: 14/453,439

(22) Filed: Aug. 6, 2014

(65) Prior Publication Data
US 2016/0042364 A1 Feb. 11, 2016

(51) Int. Cl.
G06Q 30/02 (2012.01)
G06Q 50/00 (2012.01)

(52) U.S. Cl.
CPC ..... *G06Q 30/0201* (2013.01); *G06Q 30/0252* (2013.01); *G06Q 30/0255* (2013.01); *G06Q 50/01* (2013.01)

(58) Field of Classification Search
CPC ........... G06Q 30/0201; G06Q 30/0252; G06Q 30/0255; G06Q 50/01
See application file for complete search history.

(56) References Cited

U.S. PATENT DOCUMENTS

| 6,443,840 | B2* | 9/2002 | Von Kohorn | 348/E7.024 |
| 7,131,134 | B2* | 10/2006 | Trovato | H04N 7/163 348/E7.061 |
| 8,099,315 | B2* | 1/2012 | Amento | G06Q 30/02 705/26.7 |
| 8,589,192 | B2* | 11/2013 | DeLuca | G06Q 10/02 705/5 |
| 8,593,286 | B2* | 11/2013 | Razoumov | A61B 5/0022 340/539.11 |
| 8,799,005 | B2* | 8/2014 | Pantaliano | G06Q 30/02 705/1.1 |
| 8,821,305 | B2* | 9/2014 | Cusey | A61B 5/1124 340/539.22 |
| 9,065,984 | B2* | 6/2015 | Arseneau | G06F 1/1626 |
| 9,185,095 | B1* | 11/2015 | Moritz | H04L 63/102 |
| 9,286,384 | B2* | 3/2016 | Kuper | G06F 17/30761 |
| 2002/0082969 | A1* | 6/2002 | O'Keeffe | G06Q 10/02 705/37 |

(Continued)

Primary Examiner — Jung-Mu Chuang
(74) Attorney, Agent, or Firm — Maschoff Brennan

(57) ABSTRACT

There is provided systems and method for determining a user's event experience through user actions. A user may attend an event at a venue and take various actions with respect to the event. For example, the user may dance and cheer at the event, which may be captured by a biometric reading device on a user device that the user has in their possession. Additionally, the user may share media and generate social networking interactions while at, or after the event. The user may also make purchases at the event or after the event, such as purchasing media content corresponding to the event. Based on the actions taken by the user, an enjoyment level may be determined, which may be used to further determine a quality or how overall enjoyable was the event. Thus, users may be provided with sales of products or future events matching their interests.

20 Claims, 6 Drawing Sheets

(56) References Cited

U.S. PATENT DOCUMENTS

| | | | |
|---|---|---|---|
| 2004/0171381 A1* | 9/2004 | Inselberg | H04H 20/38 455/426.2 |
| 2007/0019069 A1* | 1/2007 | Arseneau | G06F 1/1626 348/74 |
| 2007/0022445 A1* | 1/2007 | Arseneau | G06F 1/1626 725/74 |
| 2007/0197247 A1* | 8/2007 | Inselberg | G06Q 30/02 455/517 |
| 2008/0113765 A1* | 5/2008 | DeWaal | G07F 17/3244 463/25 |
| 2008/0188308 A1† | 8/2008 | Shepherd | |
| 2008/0306807 A1* | 12/2008 | Amento | G06Q 30/02 705/7.33 |
| 2008/0306826 A1* | 12/2008 | Kramer | G06Q 30/02 705/14.14 |
| 2008/0319827 A1* | 12/2008 | Yee | G06Q 30/02 705/7.29 |
| 2009/0276292 A1* | 11/2009 | Inselberg | G06Q 30/0258 455/517 |
| 2010/0042477 A1* | 2/2010 | Cavander | G06Q 30/02 705/5 |
| 2010/0306064 A1* | 12/2010 | Inselburg | G06Q 30/0241 705/14.71 |
| 2011/0208418 A1* | 8/2011 | Looney | G06Q 30/06 701/532 |
| 2011/0251862 A1* | 10/2011 | DeLuca | G06Q 10/02 705/5 |
| 2012/0078667 A1† | 3/2012 | Denker | |
| 2012/0087588 A1* | 4/2012 | Carter | G06K 9/00724 382/190 |
| 2012/0143952 A1* | 6/2012 | von Graf | G06Q 50/01 709/204 |
| 2012/0324493 A1* | 12/2012 | Holmdahl | H04H 60/33 725/12 |
| 2013/0080348 A1* | 3/2013 | Pantaliano | G06Q 30/02 705/347 |
| 2013/0124322 A1* | 5/2013 | Boland | G06Q 30/0255 705/14.58 |
| 2013/0182117 A1* | 7/2013 | Arseneau | G06F 1/1626 348/157 |
| 2013/0185103 A1* | 7/2013 | Sunshine | G06Q 10/02 705/5 |
| 2013/0238686 A1* | 9/2013 | O'Donoghue | G06Q 30/02 709/203 |
| 2013/0262631 A1* | 10/2013 | Agarwal | G06F 17/30867 709/217 |
| 2013/0274007 A1* | 10/2013 | Hilbert | A63F 13/00 463/29 |
| 2014/0095225 A1* | 4/2014 | Williams | G06Q 10/06 705/5 |
| 2014/0143250 A1* | 5/2014 | Martin | G06F 17/30598 707/737 |
| 2014/0188851 A1* | 7/2014 | Chavez | G06F 17/3087 707/722 |
| 2014/0277649 A1† | 9/2014 | Chong | |
| 2014/0282646 A1* | 9/2014 | McCoy | G06K 9/00597 725/12 |
| 2014/0304014 A1* | 10/2014 | Lee | G06Q 10/02 705/5 |
| 2015/0032658 A1* | 1/2015 | Pantaliano | G06Q 30/02 705/347 |
| 2016/0019167 A1* | 1/2016 | Krishnamurthy | G06F 17/3089 711/133 |
| 2016/0019559 A1* | 1/2016 | Borack | G06Q 30/0201 705/7.29 |

\* cited by examiner
† cited by third party

DETERMINING A USER'S EVENT EXPERIENCE THROUGH USER ACTIONS

TECHNICAL FIELD

The present application generally relates to determining a user's event experience through user actions and more specifically to processing user actions and parameters of a user that are associated with an event to determine whether the user enjoyed the event for use in future sales and marketing.

BACKGROUND

Users may attend events at venues, including sporting events, concerts, and other viewing events. While at the venue, the user may bring a user device such as mobile phones, smart watches and glasses, and tablet computers. These user devices may be utilized to post social networking interactions, message friends, and/or share media. Additionally, the user may be active while at the event, such as singing and/or dancing while at a concert. Such information may be indicative of how much the user is enjoying the event. Moreover, subsequent purchases by the user may also indicate that the user enjoyed the event, such as album purchases from a concert or sports memorabilia from a sports team. However, without receiving and processing this information, the hosting party for the event (e.g., a management company or the owner of the venue) is unaware of how successful and enjoyable the event was. Thus, the hosting party may be unaware of how to price future sales of tickets to future showings of the event or similar events. Moreover, the hosting party may not know expected revenue from the future showings or how best to advertise the future showings to maximize revenue.

Figure 1:
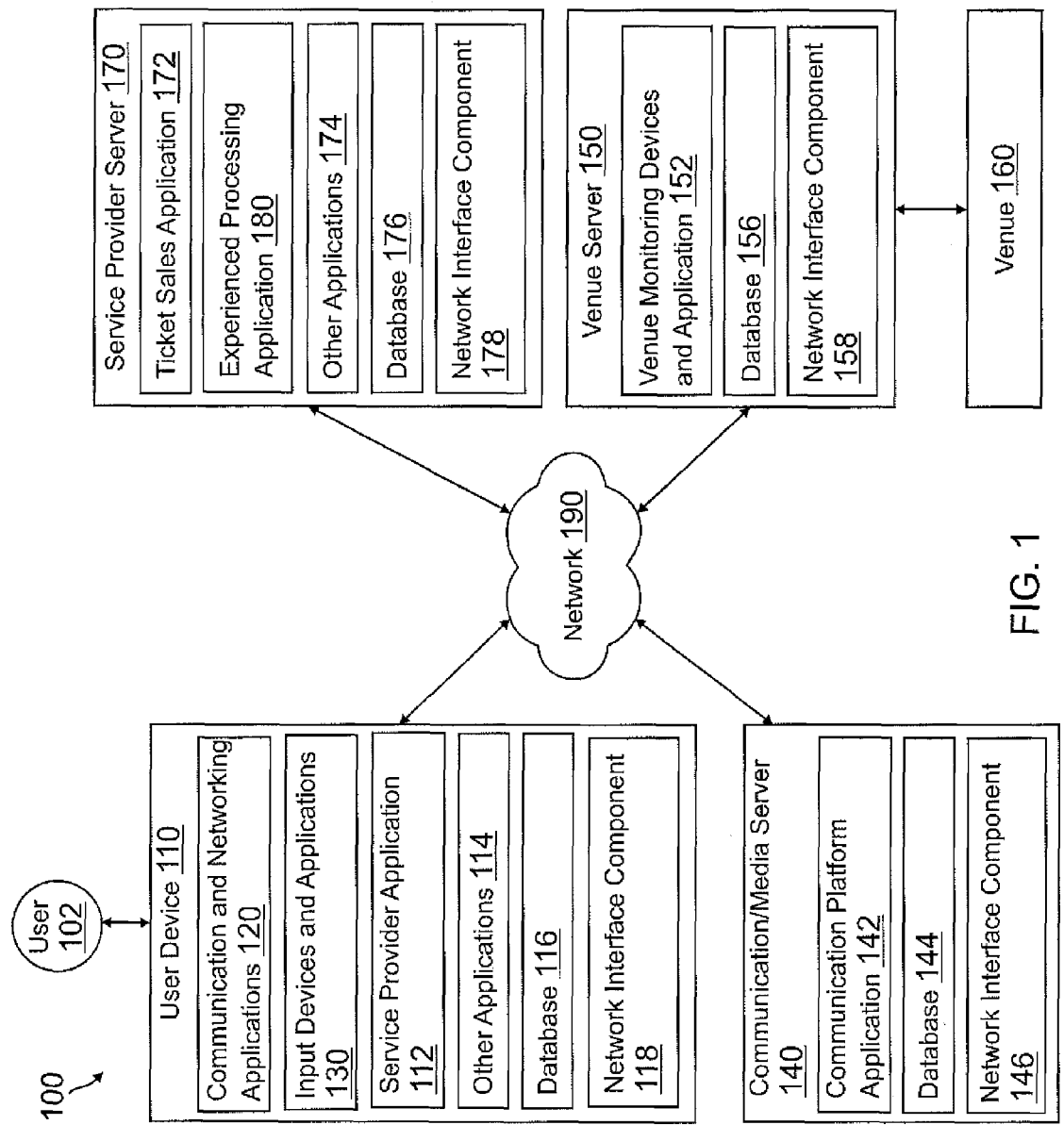
FIG. 1 is a block diagram of a networked system suitable for implementing the process described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

A user may attend an event, such as a concert, sporting game, play, or other viewable event, where the user may observe and/or interact with the event. During the event, the user may perform/various actions. For example, the user may dance, sing along, cheer, or otherwise perform various physical actions. Such actions may be documented by a user device in possession of the user. An accelerometer, gyroscope, or other motion detecting device may measure a user's movements and/or range of movement. Similarly, a device may include components to detect a user's perspiration, heart rate, voice, voice volume, ambient volume, light, eye movement and/or pupil dilation, or other physical parameter. Such physical actions and/or those action's parameters may be indicative of a user's enjoyment of the event. Thus, users who are moving, dancing, and/or perspiring may be enjoying an event more than other users who remain seated and do not interact with the event.

Additionally, while the user is at the event, the user may record media of the event, such as capturing photographs and images of the event and recording audio, video, and/or audiovisual media of the event. The media may be shared with other parties. The user may message the media to the other parties, or the user may share the media on a social networking or media sharing application/server. Additionally, the user may use such messaging, social networking, and/or media sharing platforms to message users and post statuses, messages, or comments about the event. The user may choose to share any messages, statuses, or comments with other users connected to the user through the various platforms. Those other users may also view the media, messages, statuses, and/or comments, respond to the content, like or approve of the content, or disapprove and/or ignore the content.

During and after the event, the user may make purchases related to the event. For example, the user may purchase concessions, such as food and drinks, at the event, which may be indicative that the user enjoys the event and wishes to stay at the event. The user may also purchase memorabilia and/or media content related to the event at the event or after the event. Such purchases may include sports team's memorabilia, jerseys and clothing, band shirts and other clothing, etc. The purchases may also include recordings of the event, music albums related to the event, and/or other media documenting the event. The purchases may include future showings to similar events; such as the same or similar band, another sports game featuring one of the sports teams, etc.

Utilizing the aforementioned information accrued about the user's actions associated with an event, a user enjoyment rating, level, or factor for the event may be determined. For example, a user who dances and sings at an event may be determined to be enjoying the event. The amount of dancing and/or singing may affect an overall rating or may correspond to one or a plurality of positive enjoyment experience points. The user physical actions and/or those action's parameters may be compared to base line levels for the user to determine if the actions and/or parameters are elevated. Additionally, the physical actions and/or those action's parameters may be compared to how the user normally behaves at an event. Thus, if the user always dances at events, the user may be determined to be enjoying an event as much as previous events. However, if the user rarely or never dances at events, the user's enjoyment level may be determined to be higher than normal if the user is dancing at the event.

Moreover, the user's recording and/or sharing of media, messaging, and/or social networking interactions may also be used to determine a user's enjoyment rating/level/factor. If a user is recording media at the event, the user may be determined to be having a positive enjoyment experience for the event. Additionally, based on the number of times the media is shared, messages are sent corresponding to the event, and/or social networking interactions are added corresponding to the event, the user's enjoyment level may be increased for each positive enjoyment experience. The media sharing, messages, and/or social networking interactions may be processed to determine if the media included in such content corresponds to the event. Additionally, biometrics recorded by the user device may be added to such content and also processed to determine the enjoyment level for the user at the event. The content may also be processed for words that correspond to the event, such as a band name, sports team name, score of a game, etc.

Additionally, the purchases by the user may be an indication of the user's enjoyment rating/level/factor of the event. Thus, a user who purchases an album for a band in the event may have had a positive enjoyment experience for the event and their overall enjoyment level may reflect the purchase. Thus, after processing the user's actions and those action's parameters, an enjoyment rating, level, factor, or other experience quantifier may be determined for the event. The user's enjoyment level may be utilized to determine or update a user profile having interests and/or items of interest to the user. The interests may reflect what events the user may enjoy and future purchases the user may enjoy. The user profile may be utilized to determine whether the user may wish to attend the same or a similar future event related to the interests of the user. The user profile may also be used to market to the user, such as by offering the user sales of media content, items, services, and/or other purchases related to the interests of the user in the user profile.

The user profile and/or the user's enjoyment level may also be transmitted to the venue hosting the event, a management entity hosting the event, and/or management for the performers in the event. The aforementioned entities may utilize information about multiple users' profiles and/or enjoyment levels to deter mine an overall quality, success, and/or enjoyment of the event. The quality of the event may be utilized to determine whether to host future events having the same or similar content to the first event. For example, the quality of the event may be used to determine an expected turnout for future events by matching user profiles who may like the future event, determining how successful the future event will be, and determining an expected number of tickets sold to the future event. Additionally, the quality of the event may affect ticket prices to the event, such as by lowering ticket prices to incentivize users who may not normally be interested in the event or raising ticket prices to an event that may be in high demand.

Profiles for specific groups of users or specific events may be generated based on user actions described herein. For example, users who share common traits, such as age, gender, purchasing history, affluence, geography, etc., may also share some common actions or enjoyment levels for certain types or characteristics of an event. Example: people aged 25-30 who buy a lot of high end items like longer events that have higher energy, shorter events. For examples of specific events, say a concert by a blues band in Austin, the system can determine that users aged 38-45 liked the concert more, or men aged 18-21 who attend UT liked the concert more, etc. This information can be used by the band to better market future concerts.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a communication/media server 140, a venue server 150, and a service provider server 170, in communication over a network 190. User 102, such as a consumer, utilizes user device 110 during or after an event at venue 160 to perform actions related to the event, such as physical actions at the event, messaging, sharing, and social networking interactions related to the event, and/or purchases corresponding to the event. User device 110, communication/media server 140, and/or venue server 150 record user 102's actions and/or those action's parameters and provide the information corresponding to user 102's actions and/or those action's parameters to service provider server 170 for processing.

User device 110, communication/media server 140, venue server 150, and service provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 190.

User device 110 may be implemented using any appropriate hardware and software configured for wired and/or wireless communication over network 190. For example, in one embodiment, user device 110 may be implemented as a personal computer (PC), a smart phone, laptop computer, wristwatch with appropriate computer hardware resources, eyeglasses with appropriate computer hardware (e.g. GOOGLE GLASS®), or other wearable computing device, a computing device mounted within a vehicle (e.g., a console or heads up display computing device in a vehicle), and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

User device 110 of FIG. 1 contains communication and networking applications 120, input devices and applications 130, a service provider application 112, other applications 114, a database 116, and a network interface component 118. Communication and networking applications 120, input devices and applications 130, service provider application 112, and other applications 114 may correspond to processes, procedures, and/or applications executable by a hardware processor, for example, a software program. In other embodiments, user device 110 may include additional or different software as required.

Communication and networking applications 120 may correspond to one or more applications having processes, features, and procedures to send, receive, update, and/or otherwise message and communicate with one or more other users, including networking using a social networking platform. In this respect, user 102 may enter text, media content, and other message material for transmission to another user and/or communication/media server 140. The message material may correspond to direct communications to other users or, in the case of social networking applications and platforms, may correspond to posts, statuses, or other social networking interactions that may be exposed to a plurality of other users. Media content entered to messages distributed by communication and networking applications 120 may be recorded and/or stored by user device 110, such as using input devices and applications 130, as will be explained in more detail herein. Thus, communication and networking applications 120 may be utilized to generate messages, social networking interactions, and shares of media content. Thus, communication and networking applications 120 may include email, texting, voice, IM, social networking, media sharing, and/or other communication applications that allow a user to generate and send communications using network 190.

Such communications generated by communication and networking applications 120 may correspond to an event that user 102 is experiencing. For example, a message or social networking interaction may correspond to what a user is doing at the event or how much the user is enjoying the event. A message, social networking interaction, and/or media sharing process may also include media content captured by user 102 recorded and/or stored by user device 110 of the event, as will be explained in more detail herein. The communications may be processed by service provider application 170 to determine an enjoyment level for user 102 at the event, as will be explained in more detail herein. Thus, service provider server 170 may access the communications from another server after the communications are transmitted, such as from communication/media server 140. In other embodiments, service provider application 112 may transmit information corresponding to the communications to service provider server 170.

Input devices and applications 130 may correspond to one or a plurality of devices and/or applications for use in receiving input corresponding to user 102. In this regard, input devices and applications 130 may include devices and their corresponding applications enabling user 102 to input communications, social networking interactions, and media to be shared, distributed, and otherwise transmitted by communication and networking applications 120. Input devices and applications 130 may include devices and their corresponding applications for use in recording media content, such as a camera, microphone, and corresponding camera application for recording audio, visual, and/or audio-visual content, such as audio recordings, still images, and/or video images. Thus, user 102 may utilize input devices and applications 130 to record media of the event. The media may be stored in database 116 of user device 110 and/or transmitted to a server entity for storage and/or distribution, such as communication/media server 140. The media may be shared by communication and networking application 120, as previously discussed, and may be transmitted with or embedded into communications generated by communication and networking applications 120.

In various embodiments, input devices and applications 130 may correspond to one or more devices and/or applications to determine, record, store, and/or transmit biometric readings for user 102. For example, input devices and applications 130 may include a gyroscope, accelerometer, or other device that may measure motion and/or movements of user 102. Input devices and applications 130 may also correspond to devices that may measure a user's heart rate (e.g., an electrocardiograph or other heart rate monitor), perspiration (electronic, electrolytic, oxide, etc. sensors), eye movement and/or pupil dilation (e.g., an eye reader and/or camera), voice and voice volume (e.g., a microphone) or other devices for measuring physical actions and/or parameters of user 102. The devices may include corresponding software used to receive and interpret the data collected by the devices. Input devices and applications 130 may be used to determine user 102's actions taken at an event, such as if user 102 is dancing, singing, or otherwise performing an action that may indicate user 102 is enjoying the event. The physical actions and the action's parameters may be stored in database 116 of user device 110 and/or transmitted to a server entity for storage and/or distribution, such as venue server 150 and/or service provider server 170. In various embodiments, the actions of user 102 and user 102's physical parameters (e.g., the parameters corresponding to an action, such as perspiring and moving while dancing) may be embedded in a communication, message, social networking interactions, and or media content distribution generated and transmitted by user 102 using user device 110. Thus, user 102's actions and the action's physical parameters may be transmitted to communication/media server 140 with a communication for distribution.

Service provider application 112 may include processes and/or procedures to accrue, collect, and transmit information corresponding to the actions and/or parameters of user 102. For example, service provider application 112 may receive information corresponding to user 102's actions and/or those action's parameters from one or more of communication and networking applications 120, input devices and applications 130, and/or other applications 114. Such information may also be stored to database 116 and accessed by service provider applications 112. Thus, service provider application 112 may access and/or receive information of user 102's actions and/or parameters from other applications and/or device of user device 110. In various embodiments, service provider application 112 may also be utilized to configure access by service provider server 170 to various separate entities having information about user 102's actions and/or parameters, such as communication/media server 140. Thus, service provider application 112 may enable service provider server 170 to access communications of user 102 with respect to an event from communication/media server 140.

Service provider application 112 may transmit information corresponding to the actions and/or those action's parameters to service provider server 170 for processing to determine an enjoyment level for user 102 for an event. Thus, service provider application 112 may determine which actions and action parameters correspond to an event. Such determinations may be from timestamps associated with communications, media recordings, and/or biometric/physical action recordings. Service provider application 112 may receive information of events user 102 is attending from a calendar application of user device 110 and/or service provider server 170 after user 102 has purchased or registered for tickets or admission to the event from service provider server 170. Thus, if media is recorded during the time of an event user 102 is attending, service provider application 112 may determine the media corresponds to the event. In other examples, user 102 may message or post social networking interactions, create biometric readings, purchase items, share media, or perform other actions during the time frame of the event. Service provider application 112 may also determine user 102's actions and/or parameters correspond to an event by utilizing a location for user 102 and the event, such as a GPS for user device 110 and a known address or coordinates of the event. In other embodiments, user 102 may associate text, such as file names, messaging content, and/or captions to social networking interactions, that may include the event's name, the venues name, a performer in the event, or other information associated with the event. Thus, service provider application 112 may process information associated with user 102's actions and/or parameters to determine whether those actions and/or parameters correspond to an event.

Once service provider application 112 determines user 102's actions and/or those action's parameters correspond to an event, service provider application 112 may store those actions and/or parameters together as corresponding to the event and transmit those actions and/or parameters with an event identifier to service provider server 170. As previously discussed, service provider server 170 may determine an enjoyment rating, level, or factor for user 102 at the event using the provided information. Additionally, service provider application 112 may record, process, and transmit additional information to server provider server 112 that may be indicative of user 102's enjoyment level, such as a number of times user 102's has shared recorded media, number of times user 102 has viewed or consumed recorded media, average biometrics of user 102 to compare to user 102's biometrics at the event, number of social networking interactions (e.g., posts, likes, dislikes, messages, status changes, etc.) associated with the event, price and number of purchases, number of times user 102 has viewed or consumed purchased media content, or other enjoyment level indicators.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 190, or other types of applications. Other applications 114 may contain software programs, executable by a processor, including a graphical user interface (GUI) configured to provide an interface to the user.

Other applications 114 may include media playback applications configured to play recorded and/or purchased media content. For example, user 102 may record a video of the event at venue 160 and utilize an application of other application 114 to view the video. In other embodiments, user 102 may purchase an album of a band from the event at venue 160 and listen to the album. Other applications 114 may include financial applications, such as banking, online payments, money transfer, or other payment and financial applications, which may be used to make purchases, including event ticketing purchases with service provider server 170, purchases at venue 160 with venue server 150, and/or other purchases related to an event hosted at venue 160 (e.g., memorabilia, album, clothing, etc. purchase for a performer, team, etc., in the event). In various embodiments, other applications 114 may include a browser application, which may be utilized to perform the aforementioned functions. Such information may be accessible by service provider application 112 for transmission to service provider server 170.

In various embodiments, one or more features discussed in reference to communication and networking applications 120, input devices and applications 130, and/or service provider application 112 may be incorporated in the same application so as to provide their respective features in one application.

User device 110 may further include database 116 which may include, for example, identifiers such as operating system registry entries, cookies associated with communication and networking application 120, input devices and application 130, service provider application 112, and/or other applications 114, identifiers associated with hardware of user device 110, or other appropriate identifiers, such as identifiers used for payment/user/device authentication or identification. In certain embodiments, identifiers in database 116 may be used by an account provider, such as communication/media server 140, venue server 150 and/or service provider server 170, to associate user device 110 with a particular account maintained by the account provider. Database 116 may include admission information corresponding to admission for an event at a venue, such as ticketing information. Furthermore, database 116 may further include information corresponding to actions and/or parameters of user 102, such as communications, biometric readings and physical parameters, and purchases.

In various embodiments, user device 110 includes at least one network interface component 118 adapted to communicate with communication/media server 140, venue server 150, and/or service provider server 170 over network 190. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Communication/media server 140 may be maintained, for example, by a communication provider that may provide communication services to user 102, such as messaging (e.g., SMS/MMS messaging, email, IM, etc.), social networking, and/or media sharing services. Communication/media server 140 may correspond generally to a service provider offering one or more of communication and networking applications 120. In this regard, communication/media server 140 may include processing applications, which may be configured to interact with user device 110 and/or service provider server 170, over network 190 to provide user 102's actions and/or parameters during an event at venue 160. Thus, communication/media server 140 may provide communications that user 102 generates, transmits, and/or receives during the event at venue 160. Although communication/media server 140 is shown as a single server, communication/media server 140 may correspond to a plurality of communication servers, such as individual messaging, social networking, and/or media sharing servers.

Communication/media server 140 includes a communication platform application 142, a database 144, and a network interface component 146. Communication platform application 142 may correspond to processes, procedures, and/or applications executable by a hardware processor, for example, a software program. In other embodiments, communication/media server 140 may include additional or different software as required.

Communication platform application 142 may correspond to an application that may provide communication services to user 102 through user device 110. In this regard, communication platform application 142 may provide one or more of the aforementioned communication services of communication/media server 140, such as a messaging platform, social networking platform, and/or media sharing platform. A messaging platform provided by communication platform application 142 may correspond to SMS, MMS, IM, email, or other messaging medium. Social networking platforms may correspond to a platform where user 102 may connect to one or more other users, post content (e.g., text, media, or other messages), and share content with the other users. Additionally, a media sharing platform may correspond to a platform where a user may transmit and/or receive media (e.g., audio, visual, and audiovisual content) with other users. The aforementioned features may require a user account to be established by user 102, which may be used to associate communications with user 102. In other embodiments, communication platform 142 may store communications with an identifier for user 102.

As previously discussed, while at an event hosted at venue 160, user 102 may take various actions, including communications with the use of communication/media server 140. User 102 may enable service provider server 170 to receive information about these actions (e.g., communications) and the action's parameters (e.g., a timestamp of when the communication was sent and/or received, media in the communication, number of transmissions/shares of the communication, content of the communication, a location of the communication, biometrics included in the communication, etc.). The information may be transmitted to service provider server 170 for processing from user device 110, as previously discussed. Additionally, service provider server 170 may receive the information from communication/media server 140. Service provider server 170 may require authorization from user 102 to receive communications from communication/media server 140. Additionally, such actions and those action's parameters may be stored to database 154.

Communication/media server 140 includes database 144, which may include user information and communications of user 102. The user information may include user account information having user personal, financial, and/or other information for user 102 and/or other user. The user information may also correspond to an identifier for user 102, such as a phone number, messaging name/number, and/or an identification code for user 102. The user information may be stored with communications transmitted and/or received by user 102. Database 144 may also store communications (e.g., messages, social networking interactions, and/or media shares) with communication parameters (e.g., timestamps, shares, likes, dislikes, etc.).

In various embodiments, communication/media server 140 includes at least one network interface component 146 adapted to communicate with user device 110 and/or service provider server 170 over network 190. In various embodiments, network interface component 146 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Venue server 150 may be maintained, for example, by an owner, administrator, and/or manager of venue 160 where user 102 may attend to view and/or interact with events. Venue server 150 may correspond generally to a venue owner offering events at venue 160 that may be attended through admission of users. Venue server 150 may correspond to one or a plurality of venues. Additionally, venue server 150 may offer items, products, and/or services corresponding to the venue and be maintained by anyone or any entity that receives money, which such as retailers and restaurants. In this regard, venue server 150 may include processing applications, which may be configured to interact with user device 110 and/or service provider server 170 over network 190 to provide event information and information corresponding to actions taken by user 102 during an event. Although a single venue server is shown, a plurality of venue servers may function similarly.

Venue server 150 includes venue monitoring devices and applications 152, a database 154, and a network interface component 156. Venue monitoring devices and applications 152 may correspond to processes, procedures, and/or applications executable by a hardware processor, for example, a software program. In other embodiments, venue server 150 may include additional or different software as required.

Venue monitoring devices and applications 152 may include devices and their corresponding software configured to collect information about user actions taken with respect to an event. In this regard, venue monitoring devices and applications 152 may correspond to sales and purchasing devices and applications (e.g., point of sale devices and/or cash registers), cameras, ticketing and admission devices and applications, or other devices and applications that may monitor user 102 and/or other users for an event at venue 140. For example, sales and purchasing devices and applications may correspond to devices and application that may process and/or complete sales of items and/or services to user 102. Such sales may correspond to concessions (e.g., food and drink) at venue 160, merchandise for venue 160 and/or the event at venue 160, memorabilia, etc. Additionally, sales and purchasing devices and applications may be utilized with ticketing and admission devices and applications to sell tickets to users. Thus, venue monitoring devices and applications 152 may facilitate the exchange of money for admission/items. Venue monitoring devices and applications 152 may sell admission, upgrades to admission for user 102, such as changes to seating and/or admission (e.g., seats, sections, etc.), and/or may allow users to exchange admission for other admission (e.g., exchange seats, section, etc.). In embodiments where service provider server 170 provides ticket sales functionality, venue monitoring devices and application 152 may provide on-site sales of admissions and/or items at venue 160. Venue monitoring devices and applications 152 may further include information for available merchants at or near the venue including menus of merchant items, goods, products, and/or services, and may facilitate the sale of items from the merchant, including payment to the merchant from user 102. Thus, venue monitoring devices and applications 152 may determine user 102 and other users purchasing actions, amounts, and/or items, which may be transmitted to service provider server 170 to determine a user enjoyment level for the event at venue 160.

Additionally, venue monitoring devices and applications 152 may collect information about user attendance and/or movements during an event at venue 160. For example, venue monitoring devices and application 152 may determine a number of users attending the event at venue 160 and/or provide admission to users to venue 160. For example, venue monitoring devices and applications 152 may determine if user 102 has gained admission to venue 160 through usage of an admission ticket. Once inside venue 160, venue monitoring devices and applications 152 may monitor movements of user 102 and other users, for example, using cameras within venue 160. Thus, if user 102 and/or other users move towards a stage, specific area, or subsection of venue 160, venue monitoring devices and applications 152 may record and store these actions. Venue monitoring devices and applications 152 may also monitor and record when user 102 leaves venue 160, such as during a specific part of the event at venue 160. Information corresponding to user 102 movements and/or actions during the event at venue 160 may be transmitted to service provider server 170 to determine a user enjoyment level for the event at venue 160.

In various embodiments, ticket and item sales functions provided by venue monitoring devices and applications 152 may also alter pricing to tickets for a future events based on an overall user enjoyment level to a previous event. In this regard, venue monitoring devices and applications 152 may include ticket and item pricing functions that may receive information from service provider server 170 corresponding to how enjoyable overall users found an event at venue 160. Thus, tickets and item sales for future events corresponding to the event may be altered based on the received information. For example, venue monitoring devices and applications 152 may increase ticket prices based on an event users found highly enjoyable, where demand for the event may be high. In other embodiments, venue monitoring devices and applications 152 may make certain items at a future event available, less expensive, or more expensive based on the user enjoyment level. The future event may correspond to a future showing or performance of a concert, play, sports game, etc. However, in other embodiments, service provider server 170 may provide ticket sales and adjust the ticket prices according to user enjoyment levels.

Venue server 150 includes database 154, which may include purchased admission information, purchased items, user identifiers, and/or user location information corresponding to user 102. Database 142 may further include available admission tickets at venue 160, admission ticket prices, and other information relevant to purchase of admission to the venue. Database 142 may also store received information about past events at venue 160, such as times, content, and/or overall user enjoyment levels.

In various embodiments, venue server 150 includes at least one network interface component 156 adapted to communicate with user device 110 and/or service provider server 170 over network 190. In various embodiments, network interface component 156 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Venue 160 corresponds to a location where an event may be hosted. Venue 160 may correspond to a stadium, concert hall, amphitheater, or other location where a sports game, concert, play, or other viewable and/or interactive event may take place. Venue server 150 may correspond to venue 160, for example, by providing services to venue 160. Venue server 150 may also collect data about venue 160, as previously discussed. Additionally, user 102 may attend venue 160 to view an event.

Service provider server 170 may be maintained, for example, by an online entity, which may determine a user profile of interests for user 102 using enjoyment ratings, levels, and/or factors for events attended by user 102. In various embodiments, service provider server 170 may provide ticket sales, upgrades, and additional event purchases for user 102 on behalf of venue 160. In this regard, service provider server 170 may include one or more event experience processing and ticket servicing applications configured to receive information for user 102 corresponding to an event and determine a user profile for user 102 using an enjoyment level for user 102 for the event. In one example, service provider server 170 may be provided by STUB-HUB®, Inc. of San Francisco, Calif., USA. While service provider server 170 is shown as separate from venue server 150, it is understood that one or more of the services provided by service provider server 170 may be incorporated within venue server 150. Although a single service provider server is shown, a plurality of service provider servers may function similarly Service provider server 170 includes a ticket sales application 172, other applications 174, a database 176, and a network interface component 178. Ticket sales application 172, experience processing application 180, and other applications 174 may correspond to processes, procedures, and/or applications executable by a hardware processor, for example, a software program. In other embodiments, service provider server 170 may include additional or different software as required Service provider server 170 includes ticket sales application 172, which may be configured to receive and/or access admission information corresponding to an event at a venue, such as an event hosted by venue 160. Ticket sales application 172 may first assist user 102 in purchasing admission to the event. Thus, ticket sales application 170 may provide sales services on behalf of venue server 150 or an entity hosting the event at venue 160. Ticket sales application 170 may receive ticket prices and ticket availability. Thus, user 102 may utilize user device 110 to view and purchase admission to the event. However, in other embodiments, user 102 and/or another server, such as venue server 150, may transmit the admission information for purchased tickets by user 102 from another source, such as venue server 150.

Additionally, after an event is attended by user 102 and/or other users, ticket sales application 172 may be utilized to determine sales of admission to future events corresponding to the past event. For example, ticket sales application 172 may access user enjoyment ratings/levels/factors for the past event to determine whether the event was successful, a quality of the event, and/or an overall enjoyment rating for the event. Ticket sales application 172 may then adjust, determine, or alter prices of admission to future events corresponding to the past event using the user enjoyment levels. Thus, if an event is likely to be in high demand, ticket sales application 172 may increase the prices for admission. In other embodiments, ticket sales application 172 may lower the prices to events that users did not find particularly enjoyable and may not return unless a price reduction of ticket prices occurs. Ticket sales application 172 may be further utilized to determine expected revenue for future events based on the user enjoyment levels, sales of tickets, and ticket prices.

Experience processing application 180 may correspond to an application utilized to process user actions and parameters corresponding to an event to determine a user enjoyment rating, level, factor, or experience at the event. Additionally, experience processing application 180 may determine a user profile having interests of the user based on the user's enjoyment level for the event, as well as the user's enjoyment level for additional events. In this regard, experience processing application 180 may receive information indicative of user 102's actions and parameters at an event at venue 160. As previously discussed, service provider application 112 may provide information corresponding to user 102's biometrics to experience processing application 180. User 102's biometrics may be utilized to determine if user 102 is enjoying an event at venue 160. For example, if user 102 is perspiring more than usual, is dancing or moving throughout venue 160, or is singing, talking, laughing, or otherwise communicating during the event, event processing application 180 may determine user 102 is enjoying the event. The biometrics of user 102 during the event may be compared to base line biometrics of user 102 outside of the event and/or venue 160 to determine if the biometrics are different, changed, and/or elevated. Thus, experience processing application 180 may process actions (e.g., movements, voice, etc.) and/or those action parameters (biometrics such as movement distances, eye movements, perspiration, etc.) to determine an enjoyment level for user 102 during the event.

Experience processing application 180 may also process media recordings and communications by user 102 using user device 110 corresponding to an event at venue 160. As previously discussed, communications may correspond to phone calls, messages, social networking interactions, and media sharing, and may be received from service provider application 112 and/or communication/media server 140. Thus, images and videos recorded during an event, text messages sent by user 102 to other users, social networking posts, and transmission of media to other users may be processed by experience processing application 180 to determine an enjoyment level for user 102 for the event. For example, user 102 may take photographs and/or record audio and video during the event. Such actions may correspond to positive event experience actions that may affect user 102's enjoyment level of the event. An increased number of media recordings may indicate a heightened enjoyment level. Further, user 102 may message other users about the event, which may be determined from the timestamp, content, and/or location information from the messages data and metadata. Such messages may further increase, decrease, or change user 102's enjoyment level of the event. User 102 may choose to post social networking interactions and content, such as messages, statuses, friend notices, friend requests, and/or addition of interests and groups to a social networking account. Messages and social networking interactions may also include media recordings from the event, such as photographs, video content, etc. In other embodiments, user 102 may utilize a media sharing application and/or service to share media, such as a photograph sharing application or a video sharing application. Thus, based on performing a social networking interaction or a media sharing action, experience processing application 120 may determine user 102 is enjoying the even and appropriately determine an enjoyment level for user 102 at the event. In various embodiments, the parameters of the communication actions may also be processed to determine an enjoyment level, such as an increased enjoyment level for a higher number of messages, social networking interactions, and/or media shares.

User 102 may also make purchases before, during, and/or after an event that are related to the event. For example, before an event, user 102 may order items for pick-up at the event or purchase media content (e.g., albums of a band) related to the event. During the event, user 102 may purchase concessions, may visit restaurants or other food/drink providing locations, and/or may purchase memorabilia or items related to the event. Additionally, after an event, user 102 may purchase items and/or services related to the event, such as an album of an artist in the event, tickets to a future similar viewing of the event, etc. Utilizing these purchase actions and their associated parameters (e.g., number of purchases, amount of purchases, etc.), experience processing application 180 may determine an enjoyment level for user 102. Thus, if user 102 purchases an album at or after the event, experience processing application 180 may determine user 102 enjoyed the event and adjust user 102's enjoyment level appropriately. In other embodiments, if user 102 left the event to visit a restaurant at or nearby venue 160, experience processing application 180 may determine user 102 did not enjoy the event or did not enjoy a subset of the event (e.g., a particular artist on stage at the time during a concert).

Using the above information, experience processing application 180 may determine an enjoyment rating, level, factor, or other experience quantifier. The enjoyment level may be utilized to determine a user profile having interests and items of interest to the user. Thus, if user 102 enjoyed a particular concert, user 102's user profile may include the artists from the concert as particular interests of the user. The user profile may be updated based on other events attended by user 102. Thus, the user profile may include a plurality of enjoyment levels that affect a plurality of interests. The interests may be ranked according to their relative enjoyment levels, and may also include metadata or related interests, such as categories of music, sports teams, sports categories, etc.

Once the user profile is determined by experience processing application 180, service provider server 170 may offer admission tickets, items, and/or services to user 102 that are related to the user profile. Moreover, the user profile may be provided to one or more other services to market to user 102, such as venue server 150 and/or other merchants. The user profiles of one or more users may also be utilized by service provider server 170 to adjust admission pricing to future events, such as raising tickets to high demand events and lowering tickets to incentivize users to attending other events. The user profiles may also be utilized to determine an expected revenue and/or maximize revenue through marketing and ticket prices.

Additionally, enjoyment levels for more than one user may be processed by experience processing application 180 to determine an overall enjoyment level of the particular event. The overall enjoyment level may correspond to a quality of the particular event. For example, management for an event may wish to determine how successful overall an event was, whether to host similar future events, and how to price similar future events. Thus, utilizing the enjoyment levels for a plurality of users that attended the last event, experience processing application 180 may determine an overall enjoyment level for the event. The overall enjoyment level may be sent to the management, such as venue server 150, to affect their decisions on future event hosted by the management, such as at venue 160.

In various embodiments, service provider server 170 includes other applications 174 as may be desired in particular embodiments to provide features for service provider server 170. For example, other applications 174 may include security applications for implementing server-side security features, programmatic server applications for interfacing with appropriate application programming interfaces (APIs) over network 190, or other types of applications. Other applications 174 may contain software programs, such as a graphical user interface (GUI), executable by a processor that is configured to provide an interface to the user.

Service provider server 170 includes database 176, which may be configured to store user admission information, user actions, user parameters, user enjoyment levels, and/or user profiles. Database 176 may further include transaction information, seller information, admission information, and/or parameters and parameter information for user 102, as previously discussed. Database 176 may include information processed about user 102 and other users, such as overall event enjoyment levels and event quality.

In various embodiments, service provider server 170 includes at least one network interface component 178 adapted to communicate with network 190 including user device 110, venue server 150, payment provider server 150. In various embodiments, network interface component 178 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 190 may be implemented as a single network or a combination of multiple networks. For example, in various embodiments, network 190 may include the Internet or one or more intranets, landline networks, wireless networks, and/or other appropriate types of networks. Thus, network 190 may correspond to small scale communication networks, such as a private or local area network, or a larger scale network, such as a wide area network or the Internet, accessible by the various components of system 100.

Figure 2A:
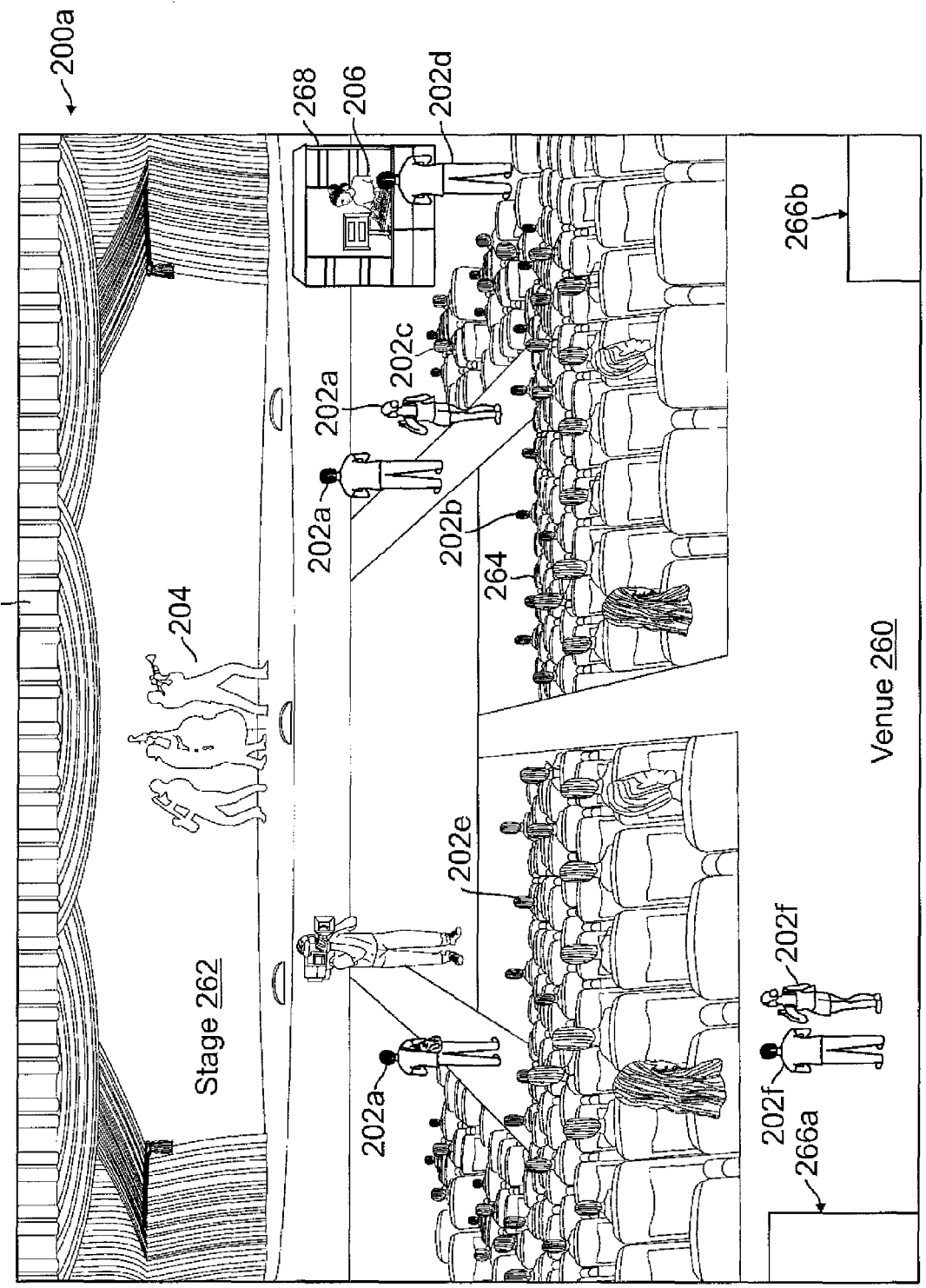
FIG. 2A is an exemplary environment showing user actions during an event, according to an embodiment.

FIG. 2A is an exemplary environment showing user actions during an event, according to an embodiment. An environment 200a of FIG. 2A includes users 202a, a user 202b, a user 202c, a user 202d, a user 202e, users 202f, and a user 202g all corresponding generally to user 202 of FIG. 1. Additionally, environment 200b includes a venue 260 corresponding to venue 160 of FIG. 1.

Environment 200a of FIG. 2A shows a plurality of users attending an event at venue 260 while performing various actions. The actions and those action's parameters may be recorded by user devices with the users and/or external devices and servers (e.g., cameras at venue 260, communication servers, etc.). Venue 260 includes a stage 262 where a band 204 is playing. Users 202a may be in a central dance floor in front of seating 264. Users 202a may be singing and/or dancing while watching band 204. Thus, user devices with users 202a may record their biometrics, which may be utilized to determine an enjoyment level for users 202a, as previously discussed. Thus, if users 202a are dancing and singing, it may be determined that users 202a are enjoying band 204. Conversely, if users 202a are just watching band 204, or are not dancing and singing more than the usually would at an event (or similar event, behavior differs at different types of events), it may be determined that users 202a's enjoyment level for band 204 is not high.

User 202b is in seating 264 while watching band 204. While in seating 264, user 202b may be utilizing a user device to record media of band 204 and share the media with friends on a social networking website or platform. Thus, since user 202b is recording and sharing media of band 204, it may be determined that user 202b is enjoying band 204. However, as shown by user 202c exiting seating 264, it may be determined that user 202c does not enjoy band 204. This may be mitigated if a determination is made that the user needed to leave (such as an appointment on the user's calendar, an incoming text message, etc.) Movement information for user 202c may be determined using a GPS or other position determining device on a user device in possession of user 202c, or if user 202c visits concessions 268 to purchase items. However, if user 202c is leaving to visit concessions because user 202c has been dancing and requires a drink, it may be determined that user 202c is enjoying band 204.

User 202d is shown at concessions 268 purchasing items from venue staff 206. Thus, user 202d may generate purchase histories, such as receipts and transaction histories, for items purchased from venue staff 206. Such items may correspond to memorabilia, concession food and drink, etc. Based on the purchase history of user 202d, an enjoyment level may be determined, as previously discussed. For example, purchases of albums at an event for band 204 may rate as a positive event experience. Thus, user 202d's enjoyment level of band 204 may reflect user 202d's purchases.

Also shown in at venue 260 is a user 202e leaving venue 260. Since user 202e is leaving while band 204 is on stage 262, it may be determined that user 202e did not enjoy band 204. In contrast, users 202f are shown arriving at venue 260 through an entrance 266a. Thus, once admission tickets are scanned and users 202f enter venue 260 at entrance 266a, users 202f may be determined to be arriving to view band 204. Thus, users 202f may be determined to enjoy band 204 and having a positive event experience. However, if users 202f do not immediately go to view band 204, and instead either wait at entrance 266a or visit concessions 268, it may be determined that users 202f do not care to see band 204, and their corresponding enjoyment levels of band 204 may reflect their event experience. Instead, user 202g is shown arriving through an entrance 266b and immediately entering seating 264 to view band 204. Thus, it may be determined that user 202g enjoys band 204 and is having a positive event experience.

Utilizing the aforementioned positive and/or negative event experiences or enjoyment of band 204, an enjoyment level for users 202a-g may be determined. The enjoyment level may be particular to each user and may be used to determine a user profile. The user profile may include band 204 and similar interest if the user is having a positive event experience and a high enjoyment level of band 204. However, if a user has a low or negative enjoyment level of band 204, the user profile may omit band 204 or find other contrasting interests to band 204. Moreover, all of users 202a-g's enjoyment levels for band 204 may be utilized to determine an overall event experience and enjoyment level for band 204 and/or the event at venue 260. The overall event experience may be utilized to determine a quality of the event.

Figure 2B:
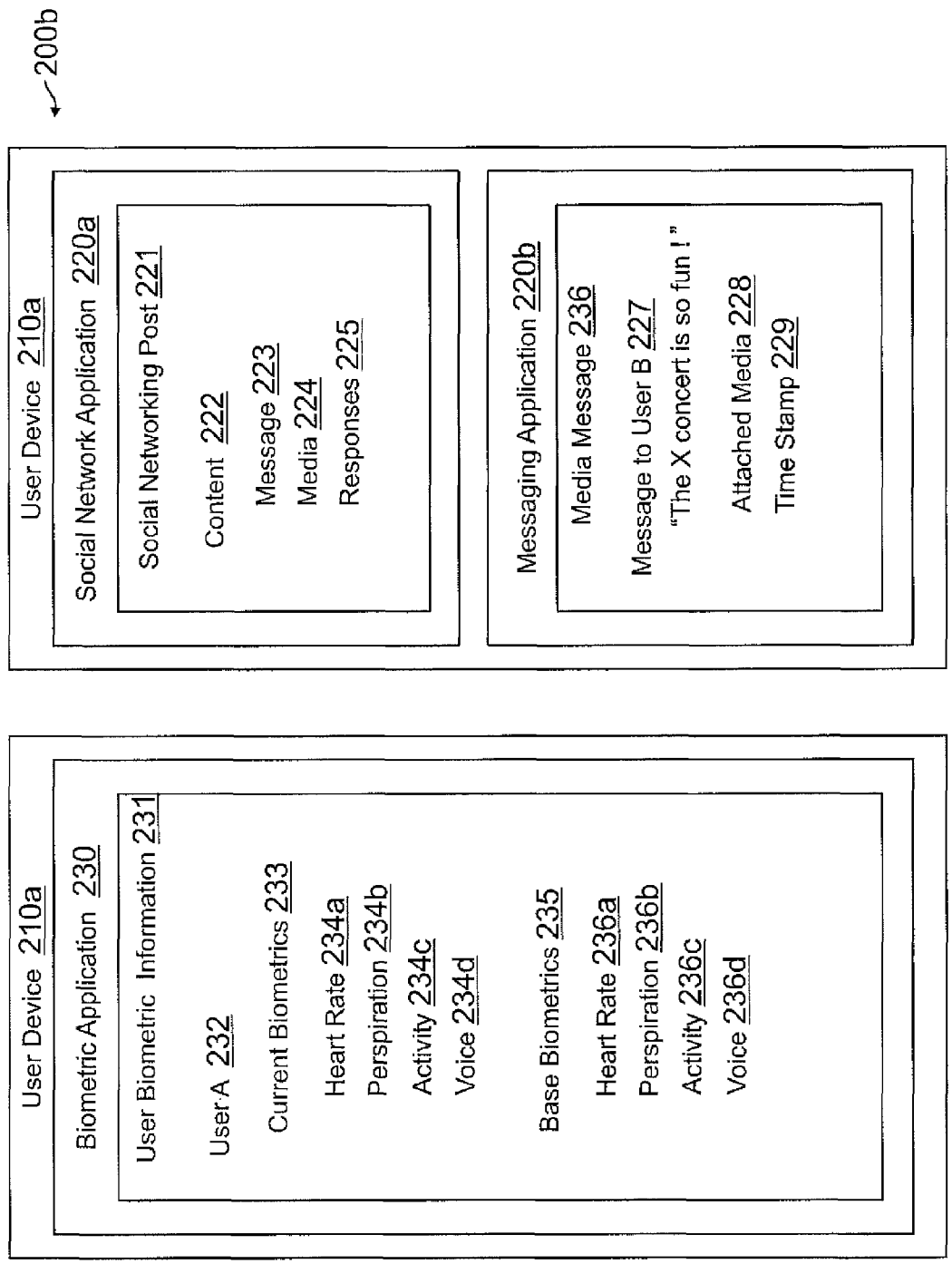
FIG. 2B is an exemplary environment having two user devices collecting information about user actions and parameters during an event, according to an embodiment.

FIG. 2B is an exemplary environment having two user devices collecting information about user actions and parameters during an event, according to an embodiment. Environment 200b of FIG. 2B includes a user device 210a and a user device 210b both corresponding generally to user device 110 of FIG. 1.

Environment 200b may correspond to an environment within an event having a first user in possession of user device 210a and a second user in possession of user device 210b. Information received and/or scraped from user device 210a and user device 210b may be utilized to determine an enjoyment level for a user. As shown in FIG. 2B, user device 210a includes a biometric application 230 corresponding generally to one or more of the described functions and processes of input devices and applications 130 of FIG. 1. Biometric application 230 may include one or more processes to record, determine, and transmit biometric information about the first user's actions and physical parameters during an event. In this regard, biometric application 230 is shown with biometric information 231 for a user A 232. User A 232 may include current biometrics 233 and base biometrics 235. Current biometrics 233 may correspond to present physical biometric readings for user A 232, while base biometrics 235 may correspond to a base line physical biometric reading for user A 232, for example, while standing, at the present time, and/or while at similar events. Current biometrics 233 include present measurements for a heart rate 234a, a perspiration (amount or rate) 234b, an activity 234c (e.g., a range of motion and/or movements), and a voice 234d (e.g., a volume, speech pattern, and/or speech content). Similarly, base biometrics 235 includes a heart rate 236a, a perspiration 236b, an activity 236c, and a voice 236d.

User device 210b includes a social networking application 220a and a messaging application 220b both corresponding generally to one or more of the described functions and processes of communication and networking applications 120 of FIG. 1. Social networking application 220a includes a social networking post 221, which may correspond to some social networking interaction using a social networking platform. Social networking post 221 includes content 222 having a message 223, media 224, and responses 225. Message 223 may include a status, message, or other text content that the second user shares through social networking post 221 during an event. Media 224 may include media content that the user has recorded during an event and shared through social networking post 221. Moreover, responses 225 include responses by other users, such as comments, likes and dislikes.

User device 210b includes a messaging application 220b having a media message 226. Messaging application 220b may correspond to a text and media content (e.g., SMS/MMS, IM, etc.) application where the second user may message other users. Media message 226 includes a message to user B 227 during an event having content that states "The X concert is so fun!" with attached media 228 and a time stamp 229. Similar to media 224, attached media 228 may include media recorded of an event and shared with user B. Time stamp 229 may be utilized to determine when the second user sent media message 226 in order to determine if media message 226 corresponds to an event.

The aforementioned information may be processed to determine an enjoyment level for the first user and the second user. For example, heightened biometrics during an event of the first user as measured by user device 210a may determine that the first user is enjoying an event by dancing, singing, etc. Similarly, social networking post 221 and media message 226 may be utilized to determine that the second user is enjoying the event by sharing with other users media that the second user has recorded of the event.

Figure 3:
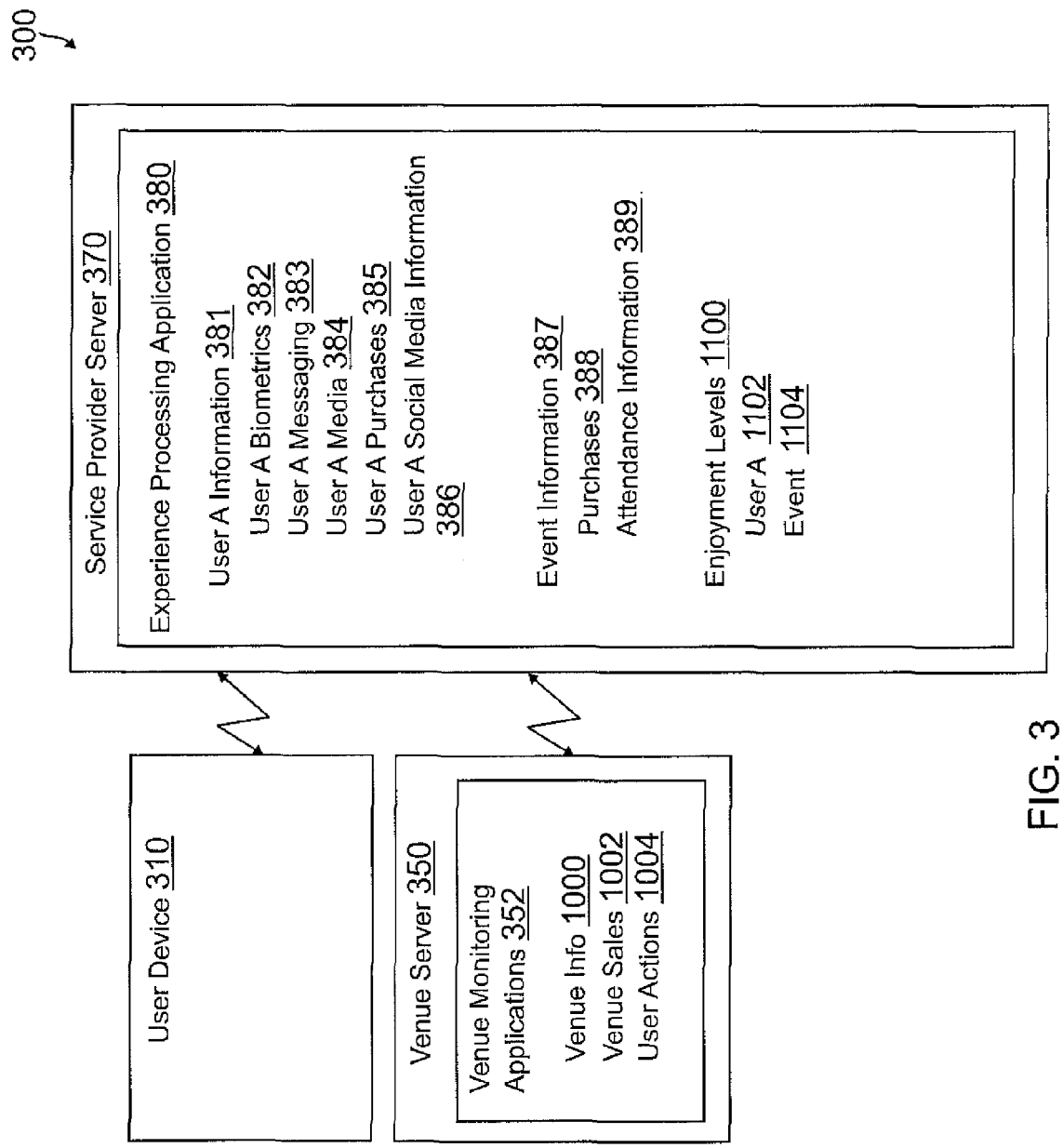
FIG. 3 is an exemplary system environment displaying enjoyment levels determined from user actions and parameters corresponding to an event, according to an embodiment.

FIG. 3 is an exemplary system environment displaying enjoyment levels determined from user actions and parameters corresponding to an event, according to an embodiment. Environment 300 of FIG. 3 includes a user device 310, a venue server 350, and a service provider server 370 corresponding generally to user device 110, venue server 150, and service provider server 170, respectively, of FIG. 1.

Service provider server 370 includes an experience processing application 380 corresponding generally to the described processes, features, and functions of experience processing application 180 of FIG. 1. In this regard, service provider server 370 receives information from user device 310 and venue server 350. As previously discussed with reference to FIGS. 1, 2A, and 2B, user device 310 may provide service provider server 270 with various user actions and those action's parameters. Additionally, venue server 350 may provide service provider server 370 with additional user actions and parameters corresponding to specific users and/or a group of users attending an event (e.g., all users in the stands at a sporting event, users at a restaurant or concession area, etc.). Thus, venue server 350 includes a venue monitoring application 352 corresponding generally to the described processes, features, and functions of venue monitoring devices and application 150 of FIG. 1. Venue monitoring application includes collected data for venue information 1000 (e.g., venue size, capacity, ticket sales, prices, number of users attending an event, etc.), venue sales 1010 (e.g., general item sales and amount of sales, specific user item sales, etc.), and user actions (e.g., general user movements during an event, specific user movements during an event, time of arrival and/or departure of specific and general users during an event, etc.). Venue server 350 may provide the aforementioned information to service provider server 370 for processing.

Experience processing application 380 may process the aforementioned information, as previously discussed, to determine user enjoyment levels and user profiles having user interests. Thus, experience processing application 380 processes user A information 381 including user A biometrics 382 (e.g., received from user device 210a of FIG. 2B), user A messages 383 (e.g., received from user device 210b of FIG. 2B), user A media 384 (e.g., received from user device 110 and/or communication/media server 140 of FIG. 1), user A purchases 385 (e.g., received from user device 110 of FIG. 1 and/or venue server 350) and user A social media interactions 386 (e.g., received from user device 210b of FIG. 2B).

Utilizing user A information 381, an enjoyment level for user A during an event may be determined. Thus, user A information 381 may be cataloged by event, such as through metadata attached to the information in each category. Once user A information 381 is processed for an event, experience processing application 380 may determine one or more enjoyment levels 110. Enjoyment levels 110o thus include user A 1102's enjoyment level for the event. Additionally, experience processing application 380 may further process other users' enjoyment levels as well as event information 387. Event information 387 includes purchases 388 (e.g., item and/or admission purchases for an event) and attendance information 389 (e.g., number of attendees, time of arrival/departure, movements, etc.). Using the user enjoyment levels, such as user A 1102, with event information 387, experience processing application 380 may determine an event 1104 enjoyment level. The event 1104 enjoyment level may correspond to an overall event experience for the plurality of users attending an event. Thus, event 1104 may determine the quality of an event and the event's success. Event 1104 may be utilized in the future to determine ticket prices, marketing, and expected revenue for future events.

Figure 4:
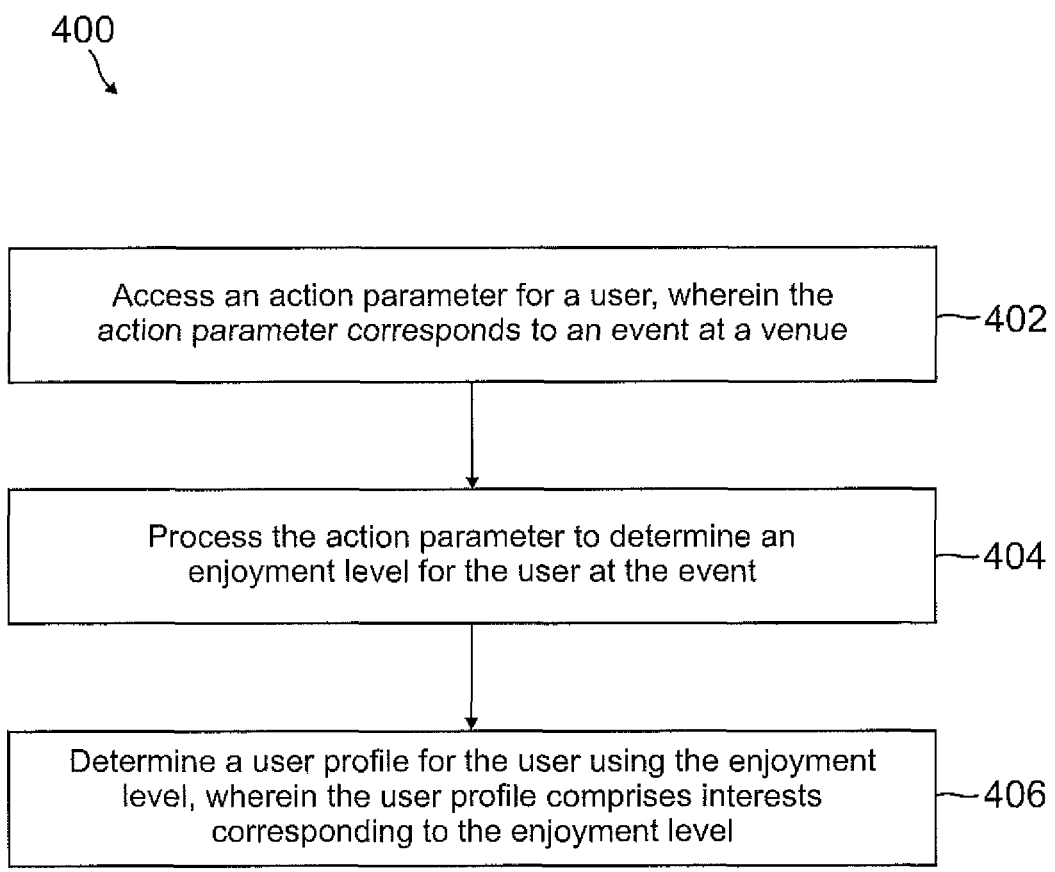
FIG. 4 is a flowchart of an exemplary process for determining a user's event experience using user actions, according to an embodiment.

FIG. 4 is a flowchart of an exemplary process for determining a user's event experience using user actions, according to an embodiment. Note that one or more steps, processes, and methods described herein may be omitted, performed in a different sequence, or combined as desired or appropriate.

At step 402, an action parameter for a user is accessed, wherein the action parameter corresponds to an event at a venue. The action parameter may correspond to a direct user action, such as a purchase, physical action, and/or communication, or may correspond to a characteristic or parameter of an action, such as movements, perspiration, social networking content, etc. For example, an action parameter may comprise a biometric reading for the user that is determined using a biometric reading device or application on a user device corresponding to the user. The biometric reading may be received from a device or embedded into a message or social networking communication. The action parameter may comprise a number of times media content is shared with at least one other user. The media content may be shared using one of a messaging application, a social networking application, and a media sharing application. In various other embodiments, the action parameter may comprise an action, such as a physical action taken by the user at the first event, a purchase of the user related to the first event, a biometric reading for the user at the first event, a message transmitted by the user corresponding to the first event, and a social networking communication by the user corresponding to the first event.

The action parameter is processed to determine an enjoyment level for the user at the event, at step 404. A plurality of action parameters for a plurality of users may also be processed to determine an enjoyment level for each of the plurality of users. Thus, at step 406, a user profile for the user is determined using the enjoyment level, wherein the user profile comprises interests for the user corresponding to the enjoyment level. Additionally, user profiles may be determined for the plurality of users. The enjoyment levels for the plurality of users for the event may also be processed to determine an overall event experience. The user profile may also be communicated to the venue for use in determining the overall event experience by the venue. The overall event experience may be utilized to determine future ticket prices to future similar events as well as expected revenue for the future events. In other embodiments, another venue hosting the event or a similar event may receive the user profile and/or overall enjoyment level to determine ticket prices and/or expected revenue from a future display of the event and/or the similar event.

The user profile may be utilized to determine and communicate a sale of an item or service to the user corresponding to the user profile. The item or service may comprise one of a ticket to an upcoming event corresponding to the first interest, a product corresponding to the first interest, and media corresponding to the first event or the first interest. A second enjoyment level for a second event may also be determined, which may affect the determination of the item or service to send to the user.

Figure 5:
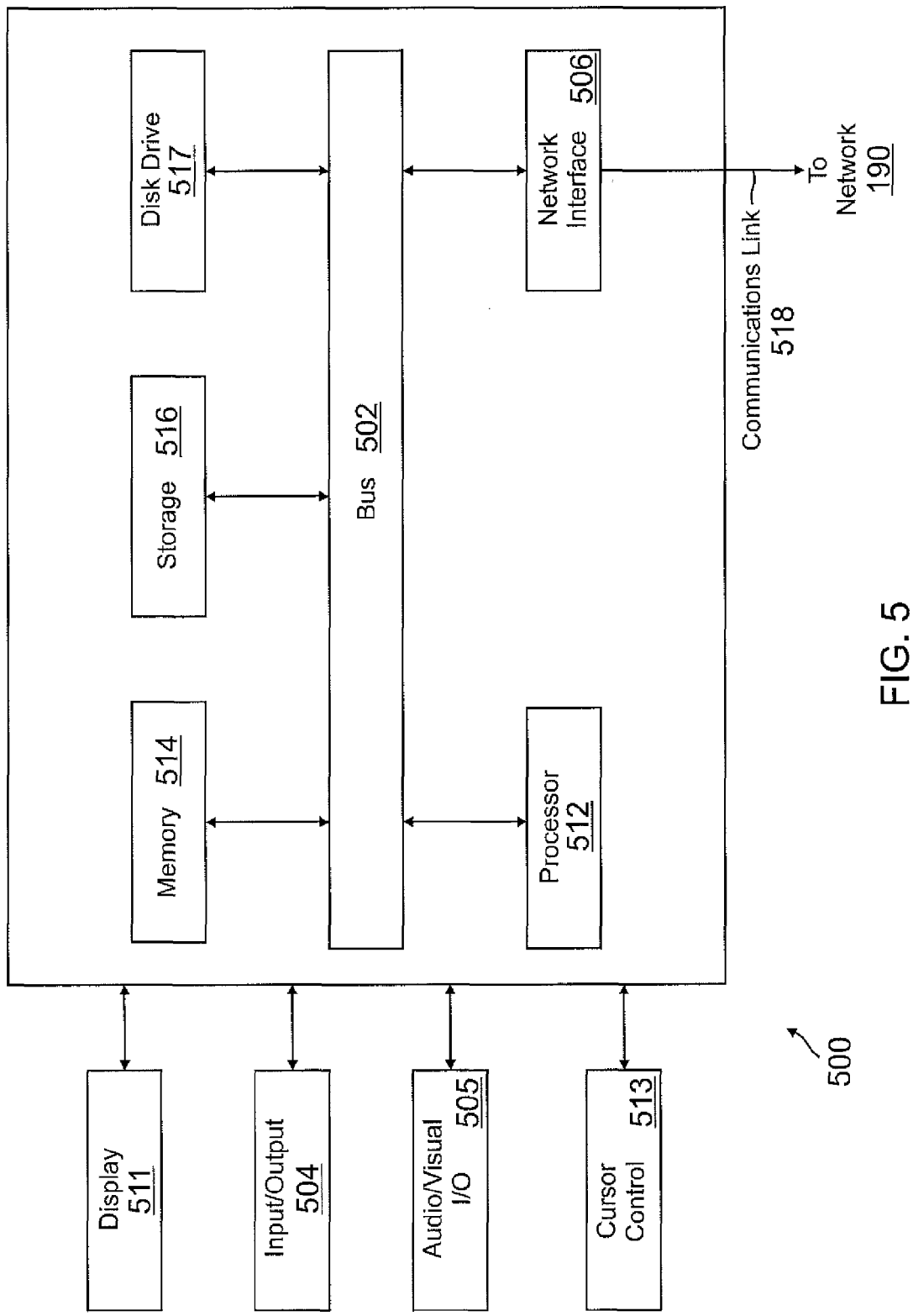
FIG. 5 is a block diagram of a computer system suitable for implementing one or more components in FIG. 1, according to one embodiment.

FIG. 5 is a block diagram of a computer system 500 suitable for implementing one or more embodiments of the present disclosure. In various embodiments, the user device may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, a merchant server, or a service provider server via network 190. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory storing user information comprising a user action parameter detected using a biometric sensor device of a device for a user: and
   one or more hardware processors in communication with the non-transitory memory and configured to perform or control performance of one or more operations, the operations comprising:
   access the user action parameter for the user, wherein the user action parameter corresponds to an event at a venue of a given type of event;
   retrieve prior user action parameters for the user at prior events attended by the user of the given type of event, wherein the prior user action parameters comprise biometric readings at the prior events;
   compare the user action parameter to the prior user action parameters;
   determine a number of online interactions performed by the user and associated with the event, wherein the number of online interactions are scraped from available content on at least one online platform, and wherein the number of online interactions are determined through processing of the available content for identification of the event;
   determine an enjoyment level for the user at the event based on the comparison of the user action parameter to the prior user action parameters and the number of online interactions;
   determine a user profile for the user based on the enjoyment level, wherein the user profile comprises items of interest of the user corresponding to the enjoyment level;
   compute an expected turnout to a future event corresponding to the event based on user profiles for a plurality of users at the event, the user profiles based on enjoyment levels, the enjoyment levels determined using one or more enjoyment factors, the plurality of users including the user, the future event including one of a same venue, a same type of event, a same content, or a same performer as the event; and
   adjust admission prices with an electronic venue ticketing application to the future event based on the expected turnout predicted based on the user profiles.

2. The system of claim 1, wherein the operations further comprise:
   determine a recommendation for the user based on the user profile, wherein the recommendation comprises a purchase or a future event corresponding to the items of interest.

3. The system of claim 1, wherein the operations further comprise:
   communicate the user profile to the venue for use in determining an overall event experience for the event.

4. The system of claim 3, wherein the overall event experience affects future ticket prices to future similar events.

5. The system of claim 1, wherein the operations further comprise:
   communicate the user profile to a second venue hosting a future display of the event for use in determining at least one of ticket prices to the future display of the event or expected revenue from the future display of the event.

6. The system of claim 1, wherein the biometric sensor device comprises one of a gyroscope, an accelerometer, a camera, a microphone, a heart rate sensor, or a perspiration monitor, and wherein the biometric sensor device captures the user action parameter as a biometric reading.

7. The system of claim 6, wherein the biometric reading is embedded in a messaging or social networking communication.

8. The system of claim 1, wherein the user information further comprises a number of times media content is shared with at least one other user.

9. The system of claim 8, wherein the media content is shared using one of a messaging application, a social networking application, or a media sharing application.

10. The system of claim 1, wherein the user action parameter is received from one of a messaging application or server, a social networking application or server, or a communication application or server.

11. A method comprising:
    accessing a first action taken by a user corresponding to a first event of a given type of event at a venue detected using a biometric sensor device of a device for a user;
    retrieving prior user actions for the user at prior events of the given type of event attended by the user, wherein the prior user actions comprise biometric readings at the prior events;
    comparing the first action to the prior user actions;
    determining a number of online interactions performed by the user and associated with the first event, wherein the number of online interactions are scraped from available content on at least one online platform, and wherein the number of online interactions are determined through processing of the available content for identification of the first event;
    determining a first enjoyment factor for the user for the first event based on the comparison of the first action to the prior user actions and the number of the online interactions;
    determining, using one or more hardware processors, a user profile for the user based on the first enjoyment factor, wherein the user profile comprises a first interest of the user corresponding to the first enjoyment factor;
    computing an expected turnout to a future event corresponding to the first event based on user profiles for a plurality of users at the event, the user profiles based on enjoyment levels, the enjoyment levels determined using one or more enjoyment factors, the plurality of users including the user, the future event including one of a same venue, a same type of event, a same content, or a same performer as the first event; and adjusting admission prices with an electronic venue ticketing application to the future event based on the expected turnout predicted based on the user profiles.

12. The method of claim 11, where the first action comprises a physical action taken by the user at the first event detected using the biometric sensor device or a biometric reading for the user at the first event.

13. The method of claim 11 further comprising:
communicating a sale of an item or a service to the user corresponding to the user profile.

14. The method of claim 13, wherein the item or the service comprises one of a ticket to an upcoming event corresponding to the first interest, a product corresponding to the first interest, or media corresponding to the first event or the first interest.

15. The method of claim 11 further comprising:
determining a second enjoyment factor for the user corresponding to a second event using a second action taken by the user corresponding to the second event; and
updating the user profile with the second enjoyment factor.

16. The method of claim 15 further comprising:
determining a second interest of the user corresponding to the first enjoyment factor and the second enjoyment factor.

17. The method of claim 16 further comprising:
communicating a sale of an item or service to the user corresponding to the user profile, wherein the item or the service corresponds to the first interest and the second interest.

18. A non-transitory computer readable medium comprising a plurality of machine-readable instructions which when executed by one or more processors of a server are adapted to cause the server to perform one or more operations, the operations comprising:
accessing actions taken by a plurality of users, wherein the actions correspond to an event at a venue of a given type of event detected using biometric sensor devices of devices for the plurality of users;
retrieving prior user actions for the plurality of users at prior events attended by the plurality of users of the given type of event, wherein the prior user actions comprise biometric readings at the prior events for the plurality of users;
comparing the actions to the prior user actions;
determining a number of online interactions performed by the plurality of users and associated with the event, wherein the number of online interactions are scraped from available content on at least one online platform, and wherein the number of online interactions are determined through processing of the available content for identification of the event;
determining an enjoyment level for each of the plurality of users for the event based on the comparison of the actions to the prior user actions and the number of the online interactions;
determining a user profile for each of the plurality of users based on the enjoyment level for each of the plurality of users;
computing an expected turnout to a future event corresponding to the event based on the user profiles for at least two of the plurality of users at the event, the future event including one of a same venue, a same type of event, a same content, or a same performer as the event; and
adjusting admission prices with an electronic venue ticketing application to the future event based on the expected turnout predicted based on the user profiles.

19. The non-transitory computer readable medium of claim 18, wherein the operations further comprise:
determining an overall event experience based on the enjoyment level for each of the plurality of users;
communicating the overall event experience to an entity hosting the event for use in determining future ticket prices and future revenue for the event.

20. The non-transitory computer readable medium of claim 18, wherein the operations further comprise:
determining an overall event experience based on the enjoyment level for each of the plurality of users;
determining an additional user interested in a future event corresponding to the event based on the overall event experience and a user profile for the additional user, wherein the user profile comprises interests of the additional user; and
communicating the future event to the additional user.

* * * * *